United States Patent
Lysen

[19]

[11] Patent Number: 6,046,799
[45] Date of Patent: Apr. 4, 2000

[54] DEVICE FOR ASCERTAINING MISALIGNMENTS OF TWO SHAFTS ARRANGED ONE BEHIND THE OTHER

[75] Inventor: Heinrich Lysen, Garching, Germany

[73] Assignee: Pruftechnik Dieter Busch AG, Ismaning, Germany

[21] Appl. No.: 09/043,910
[22] PCT Filed: Aug. 7, 1996
[86] PCT No.: PCT/EP96/03502
  § 371 Date: Mar. 31, 1998
  § 102(e) Date: Mar. 31, 1998
[87] PCT Pub. No.: WO98/05924
  PCT Pub. Date: Feb. 12, 1998
[51] Int. Cl.[7] .............................. G01B 11/26; G01B 11/00
[52] U.S. Cl. ........................ 356/139.1; 356/141.3; 356/152.1; 356/152.3; 356/153; 356/400
[58] Field of Search ................................. 356/400, 141.3, 356/152.1, 152.2, 152.3, 153, 139.1

[56] References Cited

U.S. PATENT DOCUMENTS

| | | |
|---|---|---|
| 4,698,491 | 10/1987 | Lysen ........................................ 356/400 |
| 4,864,148 | 9/1989 | Lysen et al. . |
| 5,026,998 | 6/1991 | Holzl . |

FOREIGN PATENT DOCUMENTS

| | | |
|---|---|---|
| 2 440 025 | 5/1980 | France . |
| 2 128 324 | 4/1984 | United Kingdom . |

*Primary Examiner*—Stephen C. Buczinski
*Attorney, Agent, or Firm*—Nixon Peabody LLP; David S. Safren

[57] ABSTRACT

A device for ascertaining misalignments of two shafts (1, 2) arranged one behind the other has a light emitter (6) rigidly fixed on one shaft (1) and which transmits in a manner known per se an alignment measurement beam (F) onto a detector surface (8a) of an optoelectronic position detector (8). According to the invention, the position detector (8) has another detector surface (8b) located next to the first detector surface (8a) and parallel thereto, and in front of which is mounted an optical inclinometer (9) to ascertain the momentary angle α of a predetermined radial reference direction of the shaft with respect to the earth perpendicular. The optical inclinometer (9) transmits the angle information as an angle-dependent position of a light spot on said second detector surface (8b). The angle α, which is often required to evaluate the alignment measurement signals and for other purposes, and which has a predetermined radial reference orientation of the shafts with respect to the earth perpendicular, can thus be measured with minimum additional space requirements and in a particularly favourable manner as regards the wiring technology.

4 Claims, 1 Drawing Sheet

DEVICE FOR ASCERTAINING MISALIGNMENTS OF TWO SHAFTS ARRANGED ONE BEHIND THE OTHER

BACKGROUND OF THE INVENTION

1. Field of the Invention

The invention relates to determining the existence of alignment defects in shafts that are disposed one behind the other.

2. Description of Related Art

A first known method is the so-called prism method. In the case of this method, the emitter for emitting the alignment measurement beam and the associated electrooptical position detector are situated on one and the same shaft, and the alignment measurement beam is directed at a rectangular reflecting prism, which faces it by its hypotenuse plane and which is rigidly mounted on the other shaft and reflects the light beam to the position detector with an angle of reflection which is dependent upon the respective state of alignment, so that the position of the point of incidence of the light beam on the light-sensitive detector surface is likewise dependent upon the state of alignment.

Another known method is the so-called dual radial method, in the case of which two light emitters and two biaxial electrooptical position detectors are used; in this case, a position detector and a light emitter are disposed on each shaft and the light emitter on one of the shafts sends the alignment measurement beam to the position detector on the other shaft.

There are various known modes of implementation of the abovementioned methods, e.g. one in which the mutually coupled shafts are rotated in each case through 90° and measurements are made in at least three of these angular positions having an angular spacing of 90°, or another in which the coupled shafts are rotated only through a relatively small angular range and, in this case, measurements are made in a plurality of angular positions having only small angular spacings, and then there is computed therefrom the path which the point of incidence of the light beam would describe in the case of rotation of the shaft through the range of a complete revolution, on the respective light-sensitive detector surface, in order finally to compute the alignment defect from this path.

In conjunction with the implementation of the alignment measurement in accordance with the above known methods, it is frequently necessary or at least desired also to record the angle which a predetermined radial reference direction of the one and/or other shaft includes with the vertical to the earth. For this purpose, separately from the light emitters and position detectors employed in the case of the abovementioned known alignment measurement methods, an inclinometer for establishing the instantaneous angle between the predetermined radial reference direction and the vertical to the earth was hitherto mounted on the respective shaft.

Electrooptical vertical-to-the-earth inclinometers are known which represent the angle information as a rectilinear light-dark boundary on the detector surface of a biaxial electrooptical position detector, which boundary alters its position on the detector surface in corresponding fashion in the course of the rotation of the detector housing about an axis perpendicular to the detector surface, so that the electrical signals generated by the position detector include this angle information.

SUMMARY OF THE INVENTION

The object of the invention is to design a device determining the existence of alignment defects in shafts that are disposed one behind the other in such a way that it is capable, with a minimal additional space requirement, also of measuring the angle/angles which a predetermined radial reference direction of the shaft axis (axes) exhibits to the vertical to the earth, so that additional separate inclinometers can be dispensed with.

The device according to the invention is particularly advantageous insofar as

- by mounting of the device for establishing the state of alignment, the inclinometer is also mounted on the shaft/shafts, and
- for the onward transmission of the electrical signals to the electronic evaluation circuit it is possible to employ a single cable and, as appropriate, it is also possible to use the same circuit with suitable software for the preparation of graphic or phonetic information both concerning the state of alignment of the shafts and also concerning the instantaneous angle of a radial reference direction to the vertical to the earth, whereby the necessary expenditure of costs can be considerably reduced, as compared with employing separate systems for the alignment measurement and the angle measurement with respect to the vertical to the earth.

Added to this is the fact that these advantages are achieved with a minimum of additional space requirement on the shafts.

Use of a position detector having two light sensitive surfaces that are formed by opposite surfaces of a single light-sensitive semiconductor chip is advantageous from a cost standpoint.

In the text which follows, the invention is explained in greater detail, with the aid of the drawing, by reference to an illustrative embodiment.

DETAILED DESCRIPTION OF THE INVENTION

Figure 1:
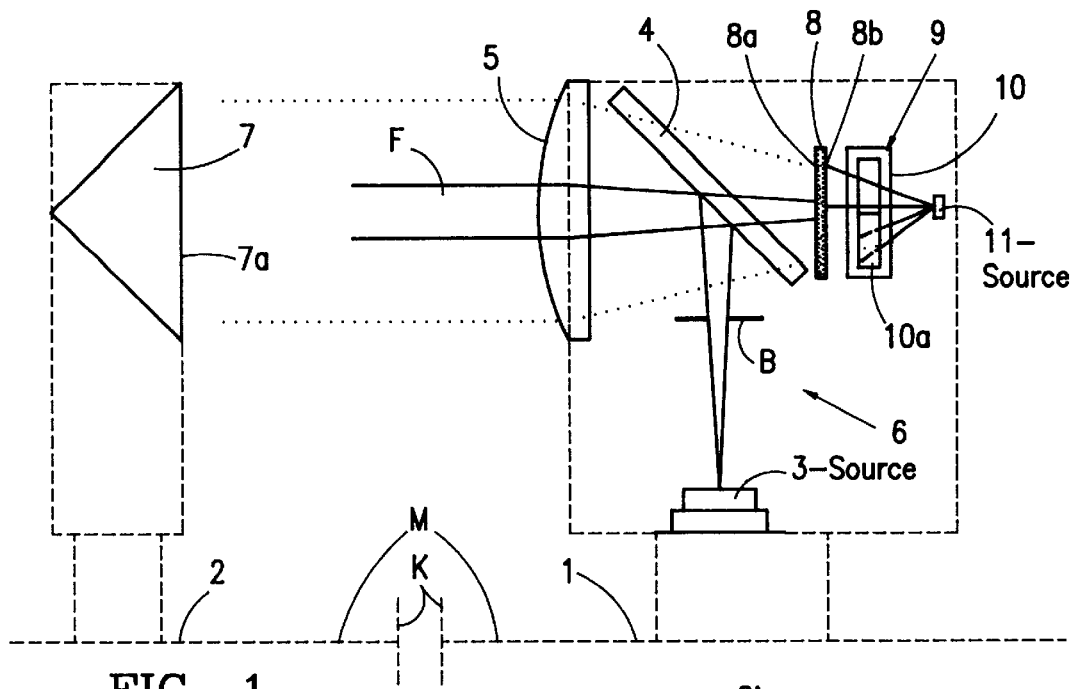
FIG. 1 shows a preferred embodiment of the device in diagrammatic representation, seen from the side.

The device shown in the drawing serves to establish alignment defects of two shafts 1, 2 which are disposed one behind the other and which are indicated only diagrammatically and which are connected to one another in rotationally fast fashion by a coupling K.

In the case of the embodiment according to FIG. 1, the device has a light emitter 6 which is rigidly connected to one of the shafts 1 and which comprises a light source 3 with diaphragm 3a, a semitransparent deflecting mirror 4 inclined at 45° to the shaft 1 and a collecting optical system 5. The light emitter 6 directs the light beam which is emitted by the light source 3 approximately perpendicular to the central axis M of the shaft 1, after deflection at the mirror 4 and concentration by means of the optical system 5, in the form of a light beam of low divergence, preferably of a parallel-concentrated laser beam, as an alignment measurement beam F substantially parallel to the shaft 1, onto a rectangular pentaprism 7, which is rigidly secured to the other shaft 2 in such a manner that its hypotenuse plane 7a faces the incident alignment measurement beam F and extends in a plane radial to the shaft 2. The pentaprism 7 reflects the incident alignment measurement beam F through the collecting optical system 5 and—in rectilinear fashion—through the deflecting mirror 4 onto the plane detector surface 8a facing it of a biaxial optoelectronic position detector 8, onto which surface the alignment measurement beam F is incident in the form of a circular light spot 9 of preferably small diameter; in this case, the position of the point of incidence P on the detector surface 8a is dependent upon whether, and if so at what angle, the central axes M of the shafts 1 and 2 cross or intersect (angular offset) and/or whether, and if so to what extent, they are mutually offset—related to parallel alignment—in a radial direction (parallel offset) . It should be noted that, in general, the parallel offset and the angular offset which must be measured and eliminated in order to avoid damage to the coupling K and to the shaft bearings, are only small.

Dependent upon the position of the point of incidence P or its rectangular coordinates x and y, the position detector 8 delivers corresponding electrical signals to a computer or a corresponding circuit arrangement, which evaluates the signals in program-controlled fashion and computes and outputs the data concerning the necessary alignment corrections to be undertaken.

The above discussed basic principle, on the basis of which the device according to FIG. 1 operates, is known and is designated as the prism method.

For various reasons, e.g. for the purposes of the evaluation of the measurement signals in the computer, it is frequently necessary or at least advantageous to note the magnitude of the angle α which a predetermined shaft-related radial reference direction currently includes with the vertical to the earth. For this purpose, in the prior art, an inclinometer was hitherto—in a manner independent of the device for measuring the state of alignment of the shafts 1, 2—separately secured to one of the two shafts.

The invention makes it possible to carry out the above-mentioned angle measurement more economically, in more space-saving fashion and in particularly accurate and operationally reliable fashion, in that the electrooptical position detector 8 of the device has a further light-sensitive detector surface 8b which is set close to the detector surface 8a for the alignment measurement, is parallel to the latter, is accessible from the other side of the detector 8 and ahead of which there is incorporated an optical inclinometer 9 to establish the instantaneous angle (α) to the vertical to the earth. This inclinometer 9 emits the angle information in the form of an angle-dependent position of a light spot L to this other detector surface 8b. The light spot L is given the particularly advantageous shape, which is evident from FIG. 3a, by means of a diaphragm which is incorporated into the optical path between the inclinometer 9 and the detector surface 8b and which is not shown in greater detail, and, in the course of rotation of the detector 8 together with the shafts 1 and 2 about their central axis M, alters its position or, more precisely, the position of its surface center of gravity S on the detector surface 8b in accordance with the angle of rotation α of the shafts 1, 2 in relation to the predetermined reference direction B, so that the electrical signals derived from the detector surface 8b contain the desired angle information related to the vertical to the earth and the selected reference position B and can be correspondingly evaluated in program-controlled fashion in the computer.

In the embodiments of the invention which are shown in the drawing, the optical inclinometer 9 has an optically transparent vessel 10 which is partially filled with an optically opaque liquid, which partially absorbs the light emitted by a further light source 11 in such a manner that only that component of the light which passes through the container 10 above the liquid falls upon the detector surface 8b, in the form of the light spot L (FIG. 3a) which is position-variable with the angle α.

Figures 3A, 3B, 3C, 3D:
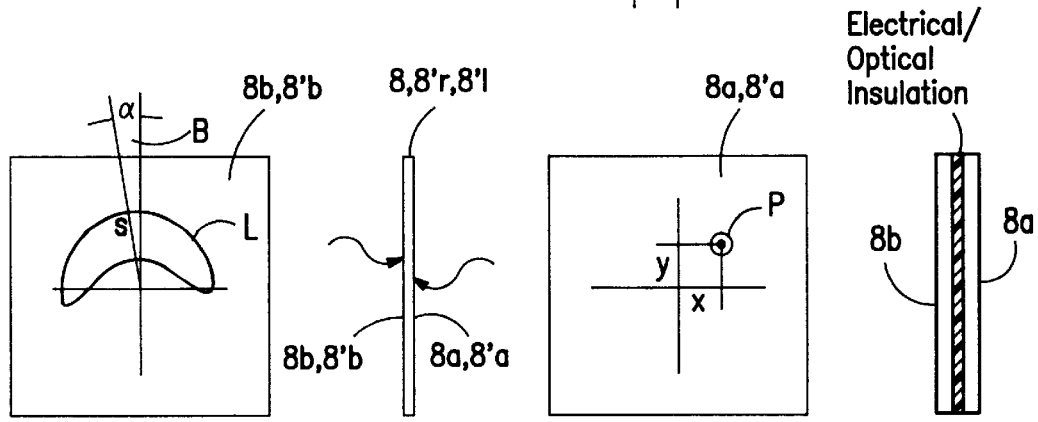
FIG. 3 shows a position detector which may be employed in the embodiments according to FIGS. 1 and 2, in the operational condition, in diagrammatic representation, from the right (a), from the front (b—elevation view) and from the left (c), as seen by the observer of FIG. 1 with (d) corresponding to (c) but showing a two chip version.

Preferably, the two light-sensitive detector surfaces 8a, 8b of the position detector 8 are formed by the opposite surfaces of one and the same light-sensitive semiconductor chip (FIGS. 1 and 3(b)). However, they may also be formed by the opposite surfaces of two semiconductor chips which are disposed back to back and which are optically and electrically insulated from one another (FIG. 3(d)).

Especially in the case of the use of a semiconductor chip which is common to both detector surfaces 8a and 8b, a particularly operationally reliable and low-cost evaluation of the electrical signals derived from the detector surfaces 8a, 8b can be achieved by means of a circuit arrangement for deenergization and deenergization of the light source 3 of the alignment measurement beam F and for the energization and deenergization of the light source 11 for the light spot L in mutually alternate sequence. This switching device is preferably arranged so that a pause exists between each deeneragization of the one light source 3 or 11 respectively and the following energization of the other light source 11 or 3 respectively.

Figure 2:
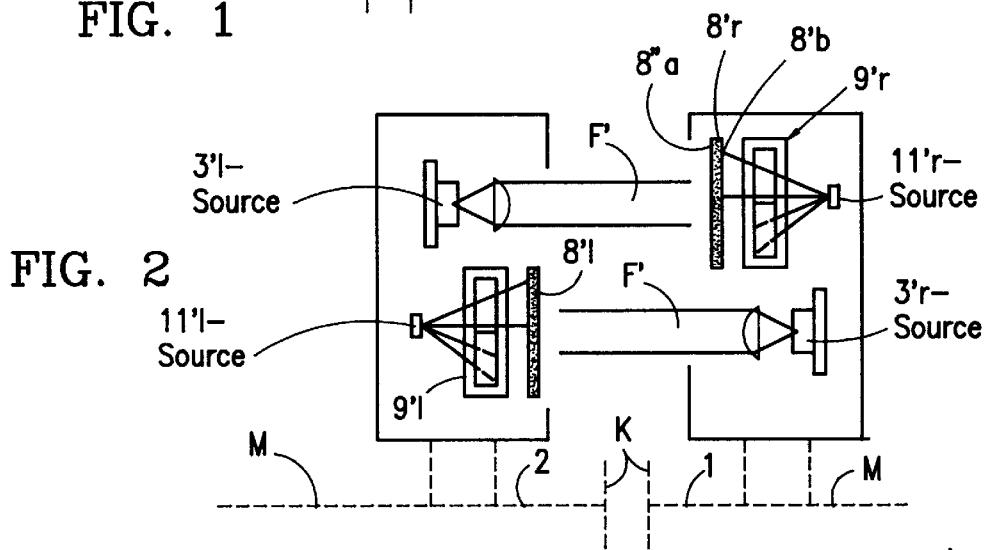
FIG. 2 shows another preferred embodiment of the device, likewise in diagrammatic representation, seen from the side.

The embodiment according to FIG. 2 differs from that according to FIG. 1 in that on each of the two shafts 1, 2 there is secured a light emitter 6'r, 6'l which emits an alignment measurement beam F' and a biaxial optoelectronic position detector 8'r, 8'l with an associated optical inclinometer 9'r, 9'l; in this case, the respective light emitter 6'r or 6'l directs its alignment measurement beam F' on to the detector surface 8a' of the optoelectronic position detector 8'l or 8'r respectively which is secured opposite to it on the respective other shaft.

The device according to FIG. 2 is likewise known from the alignment measurement principle which is designated as the dual radial method. Just as in the case of the device according to FIG. 1, what is novel in this case is the use of a further detector surface 8b', which is disposed in the immediate vicinity of the first detector surface 8a' for the alignment measurement and which is parallel thereto, with an upstream inclinometer 9'r, 9'l, and specifically in the same manner as in the case of the embodiment according to FIG. 1.

In the case of the embodiment according to FIG. 2, both optoelectronic position detectors 8'r and 8'l have a second detector surface 8b' with an upstream inclinometer 9'r or 9'l respectively. This presentation was chosen in order to show that the position detector together with an integrated inclinometer can be disposed on either of the two shafts 1, 2. In general, it will be sufficient to provide only a single optoelectronic detector with an integrated inclinometer on only one of the two shafts and to equip the other shaft with a conventional optoelectronic position detector having only one detector surface 8a on the side facing the associated light emitter.

I claim:

1. A device for establishing alignment defects of two shafts disposed one behind the other, having a) at least one light emitter which is rigidly connected to at least one of said shafts and which emits an alignment measurement beam, in the form of a light beam of low divergence, from the one shaft to the other;

b) a biaxial electro-optical position detector rigidly connected to one of the shafts for each emitted alignment measurement beam, each position detector emitting electrical signals which correspond to coordinates of a point of incidence of a respective alignment measurement beam upon a light-sensitive detector surface the position detector; and c) an electronic circuit arrangement which receives the electrical signals from each position detector and computes the state of alignment from at least the electrical signals;

wherein the at least one electro-optical position detector has two light sensitive detector surfaces which are adjacent to one another, are substantially parallel to one another, and face in opposite directions relative to each other; wherein one of said two detector surfaces receives the respective alignment measurement beam, and the other of said two detector surfaces incorporates an optical inclinometer for establishing an instantaneous angle relative to vertical; and wherein the inclinometer emits angle information as an angle-dependent position of a light spot relative to said other detector surface.

2. The device as claimed in claim 1, wherein said at least one light emitter is a laser.

3. The device as claimed in claim 1, wherein the two light-sensitive detector surfaces of the position detector are formed by opposite surfaces of a single light-sensitive semiconductor chip.

4. The device as claimed in claim 1, wherein said at least one electro-optical position detector comprises two semiconductor chips which are placed back to back and which are optically and electrically insulated from one another; and wherein the two light-sensitive detector surfaces of the position detector are formed by oppositely facing surfaces of said two semiconductor chips.

* * * * *